Patented Nov. 25, 1930

1,782,649

UNITED STATES PATENT OFFICE

HARRY C. FISHER, OF CINCINNATI, OHIO, ASSIGNOR, BY MESNE ASSIGNMENTS, TO THE PHILIP CAREY MANUFACTURING COMPANY, A CORPORATION OF OHIO

PROCESS FOR FORMING GRAYISH-BLACK SLATE GRANULES

No Drawing. Application filed June 20, 1925. Serial No. 38,568.

My process relates to the production of a grayish-black color on green slate granules. The process will not give the same identical shade when slate granules of other colors, such as red and brown, are used, but generally speaking the results are alike.

The object of my invention is to superimpose upon and cause penetration into a body of granulated slate of a coloring matter, which is relatively permanent and inseparable from the slate under severe weather conditions, giving a color effect of grayish-black nature which is more permanent and less likely to darken in the weather than the usual colors of slate as found in nature.

Briefly, the process includes a step of wetting the slate granules with a chemical solution and then heating them in a kiln to produce a granular material of desired color.

The temperature used preferably approaches that in which the slate granules become soft preliminary to melting; and I have found that in practice this preliminary softening is a reliable index of the proper temperature.

It is the object of my invention to employ, in part, pigmenting agents which undergo a change on the surface and within the surface of the mineral material to be treated, thereby forming pigments; and in my present process I utilize the colloidal penetration of pigmenting materials as set forth in my co-pending application entitled Process of coloring slate granules, Serial No. 26,828, filed the 29th day of April, 1925.

In the said co-pending application I set forth a method of securing color effect and a degree of penetration into the body of the slaty material, necessary for permanence, through the employment of a colloidal condition of one, at least, of the materials employed during some stage of the process; in this instance anhydroxide is formed which later is converted to the oxide in a state of colloidal fineness of subdivision. I have found that a colloidal hydroxide stage of certain metals when given the heat treatment in a kiln passes through a jell stage and a certain very fluid stage in which it is enabled very deeply to penetrate the body of a granular mineral material. In this present application I not only utilize this unusual power of penetration possessed by colloidal materials but by adding other pigment-forming materials to a colloidal mix, I find that I can entrap these additional pigment-forming materials within the body of the colloidal mix so that I can use the penetrating power of the mix to carry into the body of my granular material the added pigmenting agents used. In other words, I employ a colloidal mix as a vehicle to carry into the crystalline structure of mineral material pigmenting agents so that thereafter by additional heat treatment these pigmenting agents may be converted to pigments within the said mineral body and the pigments thus given a very much deeper penetration than could be attained by simply applying them direct without the aid of a vehicle. I thus achieve a deep penetration of material having normally very slight, if any, penetrating powers, and the penetrations which I obtain are, so far as I am aware, deeper than can be obtained with metallic pigments by any other method.

To give a formula which has given uniform and satisfactory results, a solution is prepared containing 15 grams ferrous sulphate ($FeSO_4.7H_2O$), 15 grams of sodium dichromate ($Na_2Cr_2O_7.2H_2O$) and 50 grams of copper sulphate ($CuSO_4.5H_2O$) in 500 cubic centimeters of water. Heating will assist in dissolving the salts in the water and after the solution has been formed the slate is wetted with the same and drained.

The wetted or coated slate is then heated and agitated for say ten or fifteen minutes, at an ultimate temperature which I estimate at 1800° Fahrenheit.

The product is a granulated slate of, generally speaking, grayish-black color, due to a pigment which appears both on the surface and beneath it. The interior of the slate granules will be no different from that of any green slate which has been given the same heat treatment.

As set forth in the co-pending application referred to above, omitting the theoretical explanation of what occurs, I have found that when sodium dichromate and ferrous sulphate, in water solution in the proper proportions, are heated, the result of the application of heat is to form along with other products, hydroxides of iron and chromium which are a jelly, being colloidal. The continued action of heat appears to cause the jelly to pass through a highly penetrative stage, during which the penetration into the slate of the original wet solution is increased. With the colloidal materials the solution of copper sulphate is also carried into the pores of the material. The continued application of heat has the result of converting the metallic compounds present into metallic oxides which are pigments. Essentially by this process I have achieved the production of a black pigment of copper oxide which is deeply penetrant within the surface of the granular mineral material.

The resultant color of the granulated slate will be modified by various factors; as for instance, the atmosphere under which the chemical conversion takes place, the presence of other pigmenting agents and to a certain extent the natural color of the heat-treated slate itself. Under conditions of proper proportions, heat, and kiln atmosphere, as set forth in my co-pending application, iron and chromium salts will give a deep and beautiful chocolate brown color. Under other conditions this color tends to become more reddish or more yellowish. It is obvious that a considerable admixture of this color with the black copper oxide will tend toward what are known as warm blacks in the finished product. My particular formula given above calls for an excess of chromium salt over that necessary to produce a pure chocolate brown color and this excess salt being converted to the green oxide tends to counteract the effect of the warmer basic tones and to give colder, more greenish or more grayish blacks. With certain slates, an oxidizing atmosphere with high heat conditions will tend to change the natural green color to a yellowish, red or reddish brown color, which tends toward warm blacks. When some green slates are roasted at a very high heat in a strongly reducing atmosphere, they become dark gray which not only assists in the production of the desired grayish-black tone, but tends in a measure to counteract any warm components of color. Furthermore, by increasing the proportion of copper salt in the original mix, the amount and visual intensity of the black pigment finally present will be increased. Thus by modifying and controlling these factors a considerable range of tone and color can be produced.

The temperature should be high enough to convert ferric sulphate, resulting from the re-action of ferrous sulphate and sodium dichromate, into red ferric oxide, which oxide is then converted into a bluish condition when the temperature exceeds around 1200° Fahrenheit. The sodium dichromate which, as already indicated, is in excess of that required to form colloidal brownish colors with the iron, should be heated sufficiently to decompose into green chromic oxide and sodium chromate, which takes place at a temperature near white heat. The copper sulphate should be heated sufficiently to change into a black cupric oxide which occurs also at a temperature around 1200° Fahrenheit. A temperature of around 1800° will, theoretically, satisfy all the above conditions.

I do not desire to be bound by the theories which I have advanced and am simply indicating them as probable explanations of what I have found occurs. In particular I have found that pigments produced through the use of dichromate and ferrous salts penetrate into the granules to a considerable depth. I have further found that by adding other pigment-forming agents to materials having such a penetrating power, I can also bring about a penetration of them into the mineral body and there convert them into pigments. I have found, finally, that while a solution of a copper salt can be applied directly to granular mineral materials and there converted into cupric oxide, which is a pigment, that the pigment will exist largely on the surface, that there will be practically no penetration thereof and that there will be very little adhesion of the pigment to the material.

With my process, however, where the granules are thin, the entire granule may be permeated with the gray-black color. Where the granules are large, a penetration from .01 to .1 of an inch has been noted under the microscope. The color is the effect of the re-action induced by the heat both in the slate and the chemicals. The cost of production is quite low, as the chemicals are not expensive, and the heating step is rapid.

The formula given is by way of example merely and it will be obvious not only that quantities and proportions may be varied in producing a gray-black color but also that the utilization of a penetrative vehicle to carry the solution of a pigment-forming compound into the body of a mineral material is applicable to the formation of many colors from many pigment-forming materials.

Having thus described my invention, what I claim as new and desire to secure by Letters Patent, is:—

1. That process of coloring granular slate to grayish black, which consists in wetting the granules with a water solution of ferrous sulphate, alkaline dichromate and copper sulphate, and then heating the materials to cause the slate to become grayish black.

2. That process of coloring granular slate, which consists in wetting it with a solution of alkali dichromate and iron sulphate, and a third compound which will decompose with heat to form a pigment, heating the slate to a degree which will produce a dry product impregnated with the oxides of the dehydrated substances and the decomposed third compound.

3. That process of coloring green slate in granular form, which consists in wetting it with a solution of sulphate salts of several metals, with or without other pigments, and a dichromate solution, and roasting the granules to a degree which begins to render the slate soft, as a preliminary stage to melting.

4. That process of producing penetration